US010582594B2

(12) United States Patent
Hiramatsu et al.

(10) Patent No.: US 10,582,594 B2
(45) Date of Patent: Mar. 3, 2020

(54) LIGHTING SYSTEM, WIRELESS CONTROLLER, AND CONTROL METHOD

(71) Applicant: Panasonic Intellecutal Property Management Co., Ltd., Osaka (JP)

(72) Inventors: Kohji Hiramatsu, Osaka (JP); Tatsumi Setomoto, Osaka (JP); Tomokazu Yamamoto, Osaka (JP); Tamotsu Ando, Osaka (JP); Hajime Ozaki, Osaka (JP)

(73) Assignee: PANASONIC INTELLECUTAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/053,140

(22) Filed: Aug. 2, 2018

(65) Prior Publication Data

US 2019/0053356 A1 Feb. 14, 2019

(30) Foreign Application Priority Data

Aug. 9, 2017 (JP) .................................. 2017-154359

(51) Int. Cl.
*H05B 37/02* (2006.01)
*H04L 29/08* (2006.01)
*H04W 8/00* (2009.01)
*H04W 52/38* (2009.01)
*H04W 52/50* (2009.01)
(Continued)

(52) U.S. Cl.
CPC ......... *H05B 37/0272* (2013.01); *H04L 67/12* (2013.01); *H04W 8/005* (2013.01); *H04W 52/36* (2013.01); *H04W 52/386* (2013.01); *H04W 52/50* (2013.01); *H05B 33/0842* (2013.01)

(58) Field of Classification Search
CPC ................ H05B 37/02; H05B 37/0272; H05B 37/0245; H05B 37/034; H04W 8/00; H04W 8/005; H04W 52/386
See application file for complete search history.

(56) References Cited

U.S. PATENT DOCUMENTS

2012/0299509 A1* 11/2012 Lee ..................... H04L 41/0806
315/291
2013/0141009 A1* 6/2013 Jin ...................... H05B 33/0863
315/292
(Continued)

FOREIGN PATENT DOCUMENTS

JP 2002-260877 A 9/2002
JP 2004-259657 A 9/2004
(Continued)

*Primary Examiner* — Thai Pham
(74) *Attorney, Agent, or Firm* — McDermott Will & Emery LLP

(57) ABSTRACT

A lighting system includes a wireless controller, luminaires each configured to communicating with the wireless controller, and a storage. The wireless controller classifies a first luminaire among the luminaires, which is able to communicate using first transmission power, into a first group and stores the first luminaire on the storage, and classifies a second luminaire among the luminaires, which is able to communicate using second transmission power greater than the first transmission power, into a second group and stores the second luminaire on the storage.

10 Claims, 5 Drawing Sheets

(51) Int. Cl.
*H04W 52/36* (2009.01)
*H05B 33/08* (2020.01)

(56) References Cited

U.S. PATENT DOCUMENTS

| | | | | |
|---|---|---|---|---|
| 2014/0062334 A1* | 3/2014 | Nagazoe | ............ | H05B 33/0863 |
| | | | | 315/292 |
| 2014/0070707 A1* | 3/2014 | Nagazoe | .............. | H04B 10/116 |
| | | | | 315/151 |
| 2015/0334811 A1* | 11/2015 | So | .......................... | H05B 37/02 |
| | | | | 315/152 |
| 2016/0302288 A1 | 10/2016 | Gotoh et al. | | |
| 2018/0242418 A1* | 8/2018 | Hidaka | .................. | H05B 37/02 |

FOREIGN PATENT DOCUMENTS

| | | |
|---|---|---|
| JP | 2014-229362 A | 12/2014 |
| JP | 2015-018636 A | 1/2015 |
| JP | 2016-091637 A | 5/2016 |
| JP | 2016-103372 A | 6/2016 |
| JP | 2016-201270 A | 12/2016 |
| WO | 2016/067713 A1 | 5/2016 |

* cited by examiner

FIG. 5

| LUMINAIRE NUMBER | TRANSMISSION POWER | GROUP |
|---|---|---|
| 201 | 1 mW | FIRST GROUP |
| 202 | 2 mW | SECOND GROUP |
| 203 | 2 mW | SECOND GROUP |
| 204 | 5 mW | THIRD GROUP |
| 205 | 5 mW | THIRD GROUP |
| 206 | 2 mW | SECOND GROUP |
| 207 | 1 mW | FIRST GROUP |
| 208 | 2 mW | SECOND GROUP |
| 209 | 5 mW | THIRD GROUP |
| 210 | 5 mW | THIRD GROUP |
| 211 | 2 mW | SECOND GROUP |
| 212 | 1 mW | FIRST GROUP |
| 213 | 2 mW | SECOND GROUP |
| 214 | 5 mW | THIRD GROUP |
| 215 | 5 mW | THIRD GROUP |
| 216 | 2 mW | SECOND GROUP |
| 217 | 2 mW | SECOND GROUP |
| 218 | 5 mW | THIRD GROUP |

LIGHTING SYSTEM, WIRELESS CONTROLLER, AND CONTROL METHOD

CROSS REFERENCE TO RELATED APPLICATION

This application claims the benefit of priority of Japanese Patent Application Number 2017-154359 filed on Aug. 9, 2017, the entire content of which is hereby incorporated by reference.

BACKGROUND

1. Technical Field

The present disclosure relates to a lighting system, a wireless controller, and a control method.

2. Description of the Related Art

For some time, a technique for performing wireless communication with luminaires to control each of the luminaires so as to turn on, turn off, etc. has been known (see, for example, Japanese Unexamined Patent Application Publication No. 2015-018636).

The lighting system disclosed in Japanese Unexamined Patent Application Publication No. 2015-018636 includes one or more luminaires (lighting devices), and a tablet terminal which is a wireless controller configured to communicate with the luminaires. The wireless controller can perform dimming control, toning control, etc. of each of the luminaires by transmitting, to the luminaires, a wireless signal for controlling the luminaires. Moreover, the wireless controller can classify the luminaires into some groups and control the luminaires for each of the groups.

SUMMARY

When the luminaires are controlled for each of the groups, the wireless controller transmits the wireless signal using strong transmission power which ensures communication with a luminaire that is difficult to receive the wireless signal from the wireless controller. Accordingly, for example, when the wireless controller transmits the wireless signal to a luminaire located relatively close to the wireless controller, the wireless controller provides the wireless signal using transmission power stronger than necessary. This increases the power consumption of the wireless controller.

In view of this, the present disclosure provides a lighting system, etc. in which the transmission power of the wireless controller for use in transmission of the wireless signal for controlling the luminaires is reduced.

A lighting system according to an aspect of the present disclosure includes: a wireless controller; a plurality of luminaires each configured to communicate with the wireless controller; and a storage, in which the wireless controller classifies a first luminaire among the plurality of luminaires, which is able to communicate with the wireless controller using first transmission power, into a first group and stores an identifier of the first luminaire on the storage, and classifies a second luminaire among the plurality of luminaires, which is able to communicate with the wireless controller using second transmission power but not able to communicate with the wireless controller using the first transmission power, into a second group and stores an identifier of the second luminaire on the storage, the second transmission power being greater than the first transmission power.

Moreover, a wireless controller according to an aspect of the present disclosure is a wireless controller configured to wirelessly communicate with a plurality of luminaires, the wireless controller including: a communication unit that communicates with the plurality of luminaires; and a controller that classifies a first luminaire among the plurality of luminaires, which is able to communicate with the communication unit using first transmission power, into a first group and stores an identifier of the first luminaire on a storage, and classifies a second luminaire among the plurality of luminaires, which is able to communicate with the communication unit using second transmission power but not able to communicate with the communication unit using the first transmission power, into a second group and stores an identifier of the second luminaire on the storage, the second transmission power being greater than the first transmission power.

Moreover, a control method according to an aspect of the present disclosure is a control method for controlling a wireless controller configured to wirelessly communicate with a plurality of luminaires, the control method including: classifying a first luminaire among the plurality of luminaires, which is able to communicate with the wireless controller using first transmission power, into a first group and storing an identifier of the first luminaire on a storage; and classifying a second luminaire among the plurality of luminaires, which is able to communicate with the wireless controller using second transmission power but not able to communicate with the wireless controller using the first transmission power, into a second group and storing an identifier of the second luminaire on the storage, the second transmission power being greater than the first transmission power.

It should be noted that the present disclosure may be implemented as a computer program for causing a computer to execute the steps included in the foregoing control method. Moreover, the present disclosure may be implemented as a computer-readable recording medium, such as CD-ROM, with the computer program recorded thereon. Moreover, the present disclosure may be implemented as information, data, or a signal indicating the computer program. The computer program, information, data, and signal may be distributed via a communication network such as an Internet.

The lighting system, etc. according to the present disclosure provides a lighting system, etc. in which the transmission power for the wireless signal for controlling the luminaires is reduced.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a diagram illustrating an exemplary relationship between luminaires and levels of transmission power, which is created by the lighting system according to the exemplary embodiment.

DETAILED DESCRIPTION OF THE EMBODIMENTS

Hereinafter, a lighting system, etc. according to an exemplary embodiment will be described with reference to the drawings. It should be noted that the subsequently-described embodiment shows a generic or specific example of the present disclosure. Therefore, numerical values, shapes, materials, structural components, the arrangement and connection of the structural components, etc. shown in the following embodiment are mere examples, and are not intended to limit the scope of the present disclosure. Furthermore, among the structural components in the following embodiment, components not recited in the independent claim which indicates the broadest concept of the present disclosure are described as arbitrary structural components.

In addition, each of the diagrams is a schematic diagram and thus is not necessarily strictly illustrated. In each of the diagrams, substantially the same structural components are assigned with the same reference signs, and redundant descriptions will be omitted or simplified.

Embodiment

[Outline of Lighting System]

Figure 1:
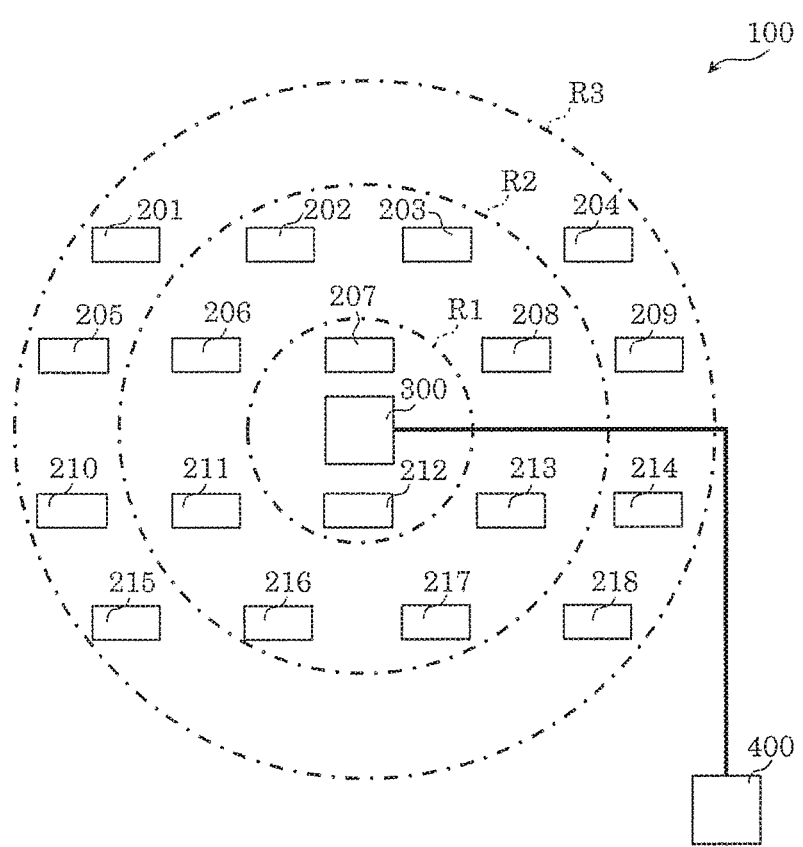
FIG. 1 illustrates a lighting system according to an exemplary embodiment.

FIG. 1 illustrates lighting system 100 according to this embodiment. In particular, FIG. 1 shows lighting system 100 according to this embodiment, and is a diagram illustrating luminaires 201 to 218, wireless controller 300, and terminal device 400 included in lighting system 100. It should be noted that 18 luminaires are shown in FIG. 1, but this is merely an example. Actually, 100 luminaires or more may be installed in a ceiling of a building, etc. Hereinafter, the luminaires may be generically referred to as luminaire 200.

Each luminaire 200 and wireless controller 300 are installed in a building component such as a ceiling of a building, and can wirelessly communicate with each other. The exemplary wireless communication system is Zigbee (registered trademark), Bluetooth (registered trademark), WiFi (registered trademark), or a specified low-power wireless system which uses a 920 MHz band or 2.4 GHz band frequency.

Wireless controller 300 transmits a wireless signal to luminaire 200. Luminaire 200 receives the wireless signal, and turns on, turns off, etc. in a state corresponding to the wireless signal. In other words, wireless controller 300 is a communication device configured to transmit a wireless signal for controlling the lighting state, etc. of luminaire 200.

Moreover, wireless controller 300 may be configured to transmit wireless signals using different levels of transmission power. For example, wireless controller 300 may transmit first signal (wireless signal) R1 using first transmission power, second signal (wireless signal) R2 using second transmission power greater than the first transmission power, and third signal (wireless signal) R3 using third transmission power greater than the second transmission power.

Moreover, wireless controller 300 and terminal device 400 can communicate with each other by wire or wirelessly. The exemplary wireless communication system is the same system as the wireless communication between luminaire 200 and wireless controller 300. Moreover, wireless controller 300 and terminal device 400 each may have a connection terminal, such as a universal serial bus (USB), to communicate with each other by wire.

[Configuration of Lighting System]

Next, the specific configuration of lighting system 100 will be described.

Figure 2:
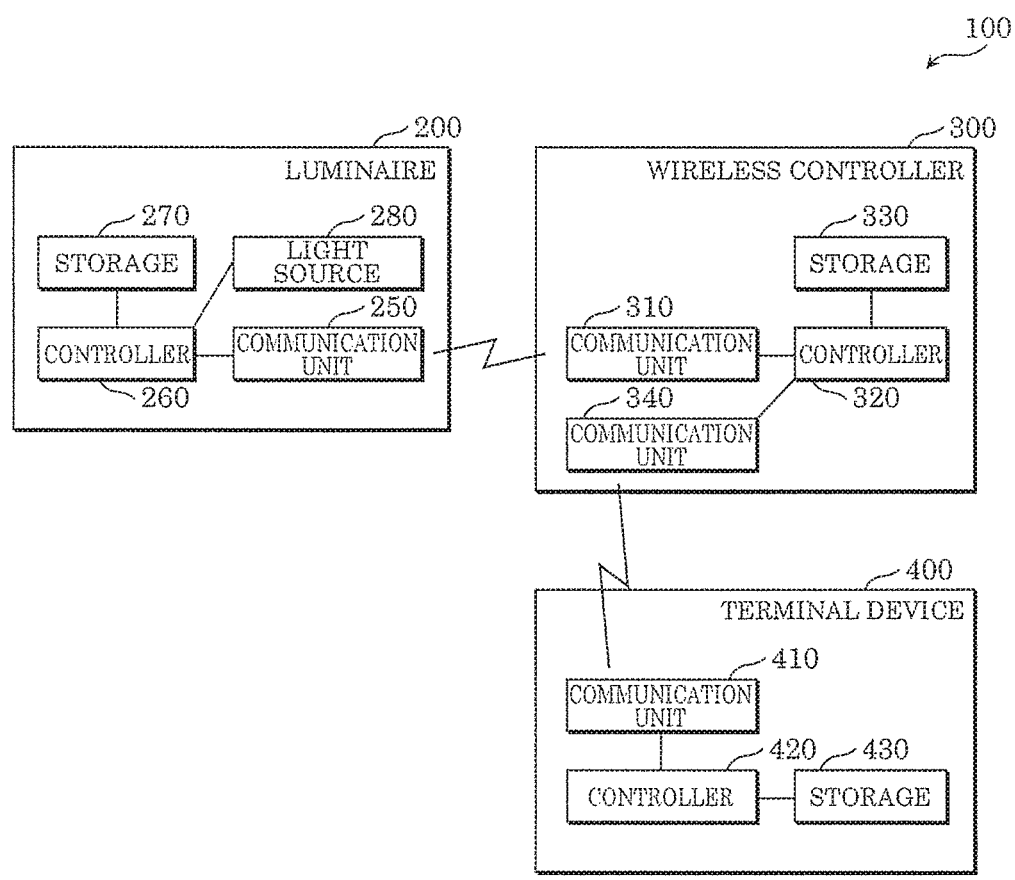
FIG. 2 is a block diagram illustrating a distinctive functional configuration of the lighting system according to the exemplary embodiment.

FIG. 2 is a block diagram illustrating a distinctive functional configuration of lighting system 100 according to this embodiment.

Lighting system 100 includes luminaire 200, wireless controller 300, and terminal device 400.

Luminaire 200 includes communication unit 250, controller 260, storage 270, and light source 280.

Communication unit 250 wirelessly communicates with wireless controller 300. Communication unit 250 includes, for example, an antenna and a wireless module. Communication unit 250 is communicatively coupled to communication unit 310 of wireless controller 300.

Controller 260 is a control device for performing turn-on, turn-off, dimming, and/or toning control of light source 280. Controller 260 is implemented as, for example, a central processing unit (CPU) and a control program stored on storage 270 and executed by the CPU. Controller 260 obtains a wireless signal from wireless controller 300 via communication unit 250, and controls light source 280 based on the obtained wireless signal.

Storage 270 is a memory storing the control program of controller 260. Storage 270 includes a random access memory (RAM), a read only memory (ROM), a solid state drive (SSD), a hard disc drive (HDD), a flash memory, and/or others.

Light source 280 includes, for example, one or more light-emitting diodes which emit white light, red light, green light, and/or blue light. Luminaire 200 is, for example, a light-emitting diode (LED) light, and installed in a ceiling which is an exemplary building component. An example of luminaire 200 is a ceiling light, a downlight, etc.

Wireless controller 300 is a communication device which transmits a wireless signal for controlling luminaire 200. Wireless controller 300 includes communication units 310, 340, controller 320, and storage 330.

Communication units 310 and 340 wirelessly communicate with luminaire 200 and terminal device 400, respectively. More specifically, communication unit 310 is communicatively coupled to communication unit 250 of luminaire 200, and communication unit 340 is communicatively coupled to communication unit 410 of terminal device 400. Communication units 310, 340 each include, for example, an antenna and a wireless module.

Moreover, communication unit 310 communicates with luminaires 200 using multiple levels of transmission power. More specifically, communication unit 310 communicates with luminaires 200 using the first transmission power and the second transmission power greater than the first transmission power. For example, communication unit 310 communicates with a part of luminaires 200 using the first transmission power, and communicates with the other part of luminaires 200 using the second transmission power. It should be noted that communication unit 310 may communicate with luminaire 200 using power greater than the second transmission power. FIG. 1 further shows exemplary communication with the luminaires using third transmission power greater than the second transmission power.

Controller 320 is a control device which controls the transmission of the wireless signal for controlling luminaire 200. Controller 320 is implemented as, for example, a CPU and a control program stored on storage 330 and executed by the CPU. Controller 320 obtains an instruction from terminal device 400 via communication unit 340, generates the wireless signal based on the obtained instruction, and transmits the generated wireless signal to luminaire 200 via communication unit 310.

Moreover, controller 320 classifies the first luminaire among luminaires 200, which is able to communicate with communication unit 310 using the first transmission power, into the first group and stores the first luminaire on storage 330, and classifies the second luminaire among luminaires 200, which is able to communicate with communication unit 310 using the second transmission power, into the second group and stores the second luminaire on storage 330, for example.

It should be noted that storing luminaire 200 on storage 330 means that the unique identifier of intended luminaire 200 is stored on storage 330.

More specifically, controller 320 broadcasts first signal R1, which is transmitted using the first transmission power, to luminaires 200, identifies, as the first luminaire, a luminaire that responds to first signal R1, classifies the first luminaire into the first group, and stores the first luminaire on storage 330. Moreover, after transmitting first signal R1, controller 320 broadcasts second signal R2, which is transmitted using the second transmission power, to luminaires 200, identifies, as the second luminaire, a luminaire that responds to second signal R2 among luminaires 200 other than the first luminaire, classifies the second luminaire into the second group, and stores the second luminaire on storage 330.

In this manner, wireless controller 300 transmits the wireless signals to luminaires 200 using different levels of transmission power via communication unit 310, and creates table information indicating a relationship between luminaires 200 and levels of transmission power capable of establishing communication with respective luminaires 200, based on the response to the transmitted wireless signals.

Wireless controller 300 transmits first signal R1 multiple times, identifies, as the first luminaire, a luminaire that responds to first signal R1 at least the first target number of times among luminaires 200, classifies the first luminaire into the first group, and stores the first luminaire on storage 330, for example. Wireless controller 300 also transmits second signal R2 multiple times, identifies, as the second luminaire, a luminaire that responds to second signal R2 at least the second target number of times, classifies the second luminaire into the second group, and stores the second luminaire on storage 330.

For example, wireless controller 300 repeats the transmission of first signal R1 100 times. In the case where the first target number of times is set to 99, upon receiving a response signal 99 or 100 times from luminaire 200 as a response to first signal R1, wireless controller 300 classifies a source luminaire sending the response signal into the first luminaire. The same is true of second signal R2.

It should be noted that the number of times that wireless controller 300 repeats the transmission of first signal R1 and second signal R2, the first target number of times, and the second target number of times are not particularly limited. Moreover, the number of times that wireless controller 300 repeats the transmission of first signal R1 and the number of times that wireless controller 300 repeats the transmission of second signal R2 may be the same or different. The first target number of times and the second target number of times may be the same or different.

Moreover, for example, the second transmission power may be greater than the first transmission power, and set to a value obtained by multiplying the first transmission power by a coefficient that is greater than 1, for example.

Moreover, controller 320 may classify the first luminaire, which is able to communicate using the first transmission power, into the first group and store the first luminaire on storage 430 of terminal device 400, and classify the second luminaire, which is able to communicate using the second transmission power, into the second group and store the second luminaire on storage 430 of terminal device 400. In other words, the table information created by wireless controller 300 and indicating the relationship between luminaires 200 and levels of transmission power may be stored on storage 330 of wireless controller 300 or storage 430 of terminal device 400.

Moreover, controller 320 performs paring with each of luminaires 200, for example, based on the created table information. In other words, controller 320 performs pairing with the first luminaire using the first transmission power, and performs pairing with the second luminaire using the second transmission power. It should be noted that the pairing means that authentication information for authenticating each other, address information (e.g., media access control (MAC) address), or the like is exchanged between wireless controller 300 and luminaire 200, and the pairing of wireless controller 300 and luminaire 200 enables wireless controller 300 to individually communicate with paired luminaire 200 among luminaires 200.

Moreover, controller 320 transmits a wireless signal for controlling the lighting of paired luminaires 200, via communication unit 310. When transmitting the wireless signal, controller 320 transmits, based on the created table information, the wireless signal to the first luminaire using the first transmission power and to the second luminaire using the second transmission power.

It should be noted that controller 320 is described as dividing luminaires 200 into the first and second luminaires, but the number of groups into which the luminaires are classified is not particularly limited. For example, controller 320 may classify the first luminaire, which is able to communicate using the first transmission power, into the first group and store the first luminaire on storage 330, classify the second luminaire, which is able to communicate using the second transmission power greater than the first transmission power, into the second group and store the second luminaire on storage 330, and classify the third luminaire, which is able to communicate using the third transmission power greater than the second transmission power, into the third group and store the third luminaire on storage 330.

Storage 330 is a memory storing the control program of controller 320. Storage 330 includes a RAM, a ROM, a SSD, a HDD, a flash memory, and/or others.

Terminal device 400 is a server device which provides wireless controller 300 with an instruction on the wireless signal for controlling luminaire 200. For example, in the lighting system including two or more wireless controllers 300, terminal device 400 provides each of wireless controllers 300 with an instruction on how to control the luminaire to be controlled by each wireless controller 300. Terminal device 400 includes communication unit 410, controller 420, and storage 430.

Communication unit 410 wirelessly communicates with wireless controller 300. More specifically, communication unit 410 is communicatively coupled to communication unit 340 of wireless controller 300. Communication unit 410 includes, for example, an antenna and a wireless module.

Controller 420 is a control device which provides an instruction on the wireless signal to be transmitted from wireless controller 300 to luminaire 200. Controller 420 is implemented as, for example, a CPU and a control program stored on storage 430 and executed by the CPU. Controller 420 receives an instruction from a user, for example, in an operation unit of terminal device 400 such as a touch panel which is not shown in the drawings, and transmits the received instruction to wireless controller 300. Wireless controller 300 obtains the instruction from terminal device 400 via communication unit 340, generates the wireless signal based on the obtained instruction, and transmits the generated wireless signal to luminaire 200 via communication unit 310.

Storage 430 is a memory storing the control program of controller 420. Storage 430 includes a RAM, a ROM, a SSD, a HDD, a flash memory, and/or others. Moreover, storage 430 may store the table information indicating the relationship between luminaires 200 and levels of transmission power capable of establishing communication from wireless controller 300.

[Operational Procedure of Lighting System]

Next, a procedure for determining transmission power for a wireless signal in wireless controller 300 will be described. It should be noted that the table information indicating the relationship between luminaires 200 and levels of transmission power capable of establishing communication with respective luminaires 200 will be described as being stored on storage 330 of wireless controller 300.

Figure 3:
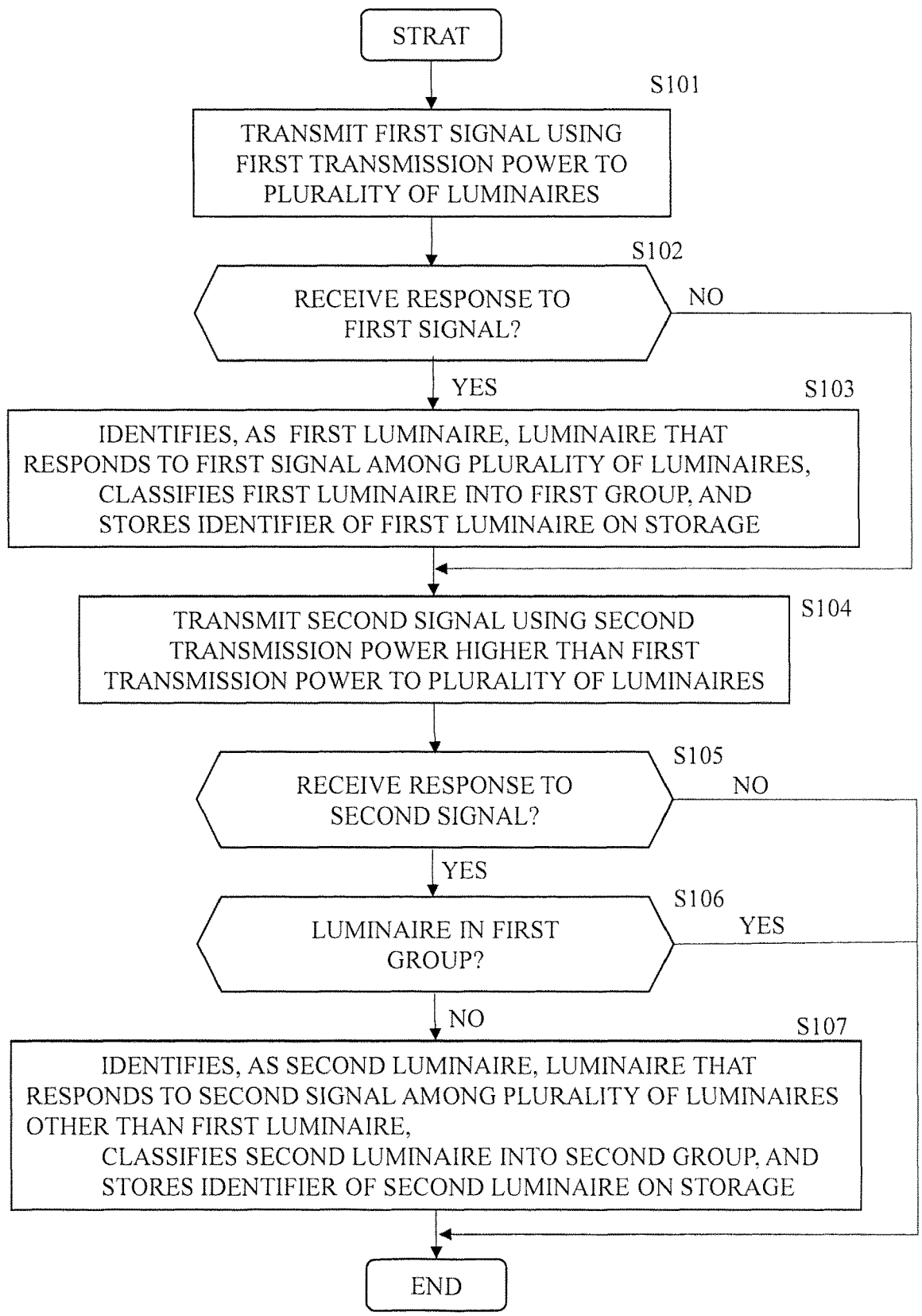
FIG. 3 is a flowchart illustrating a procedure for determining transmission power for a wireless signal in a wireless controller according to the exemplary embodiment.

FIG. 3 is a flowchart illustrating the procedure for determining transmission power for a wireless signal in wireless controller 300 according to this embodiment.

Wireless controller 300 transmits first signal R1 which is the wireless signal, using the first transmission power (Step S101). More specifically, at Step S101, controller 320 of wireless controller 300 transmits first signal R1 via communication unit 310.

Next, controller 320 of wireless controller 300 determines whether or not a response to the transmitted first signal R1 has been received (Step S102).

Upon receiving a response signal which is the response to the transmitted first signal R1 (Yes at Step S102), controller 320 of wireless controller 300 identifies a source luminaire sending the received response signal as the first luminaire, classifies the source luminaire into the first group, and stores the source luminaire on storage 330 (Step S103).

Next to Step S103 or upon receiving no response signal which is the response to the transmitted first signal R1 (No at Step S102), controller 320 of wireless controller 300 transmits second signal R2 which is the wireless signal, using second transmission power greater than the first transmission power (Step S104). More specifically, at Step S104, controller 320 of wireless controller 300 transmits second signal R2 via communication unit 310.

Next, controller 320 of wireless controller 300 determines whether or not a response to the transmitted second signal R2 has been received (Step S105).

Upon receiving a response signal which is the response to the transmitted second signal R2 (Yes at Step S105), controller 320 of wireless controller 300 determines whether or not a source luminaire sending the received response signal is the first luminaire (Step S106).

When the source luminaire sending the received response signal is not the first luminaire (No at Step S106), controller 320 of wireless controller 300 identifies the source luminaire sending the received response signal as the second luminaire, classifies the source luminaire into the second group, and stores the source luminaire on storage 330 (Step S107).

On the other hand, next to Step S107 or upon receiving no response signal which is the response to the transmitted second signal R2 (No at Step S105), or when it is determined that the source luminaire sending the received response signal is the first luminaire (Yes at Step S106), controller 320 of wireless controller 300 terminates the processing, for example.

It should be noted that when the number of luminaires for which the transmission power is checked is pre-stored on storage 330, controller 320 of wireless controller 300 may continue to transmit wireless signals using different levels of transmission power until the response signal is received from all the luminaires stored on storage 330.

Moreover, controller 320 of wireless controller 300 may transmit wireless signals a predetermined number of times using different levels of transmission power, and classify the luminaires from which no response signal is received, into a different group. Lighting system 100 may be configured such that a user assigns an address to a luminaire classified into the different group, and the wireless signal is transmitted to the luminaire classified into the different group, via another luminaire (in other words, by hopping), for example.

Figure 4:
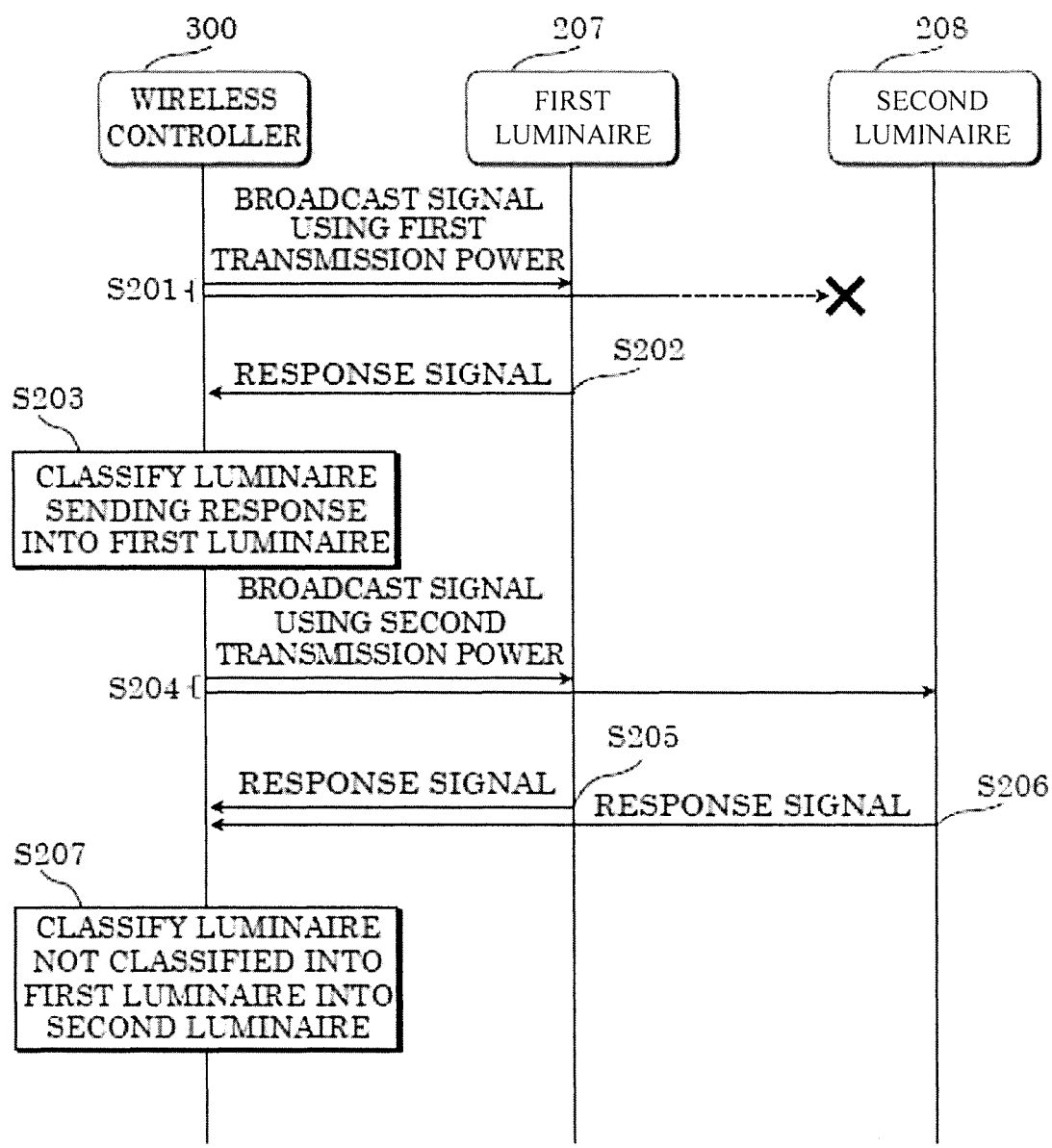
FIG. 4 is a sequence diagram illustrating a procedure for determining transmission power for a wireless signal in the lighting system according to the exemplary embodiment.

FIG. 4 is a sequence diagram illustrating a procedure for determining transmission power for a wireless signal in lighting system 100 according to this embodiment. It should be noted that in FIG. 4, wireless controller 300, and luminaire 207 and luminaire 208 shown in FIG. 1 are taken as an example for description purposes.

Controller 320 of wireless controller 300 broadcasts first signal R1 using the first transmission power (Step S201).

Here, as Step S201, it is assumed that first signal R1 transmitted by wireless controller 300 arrives at luminaire 207, whereas first signal R1 does not arrive at luminaire 208. Luminaire 207 transmits a response signal in response to first signal R1 transmitted by wireless controller 300 (Step S202).

Upon receiving the response signal from luminaire 207, controller 320 of wireless controller 300 identifies luminaire 207 as the first luminaire, classifies luminaire 207 into the first group, and stores luminaire 207 on storage 330 (Step S203).

Controller 320 of wireless controller 300 further broadcasts second signal R2 using the second transmission power via communication unit 310 (Step S204).

Here, as Step S204, it is assumed that second signal R2 transmitted by wireless controller 300 arrives at both luminaire 207 and luminaire 208. Luminaire 207 transmits a response signal in response to second signal R2 transmitted by wireless controller 300 (Step S205). In addition, luminaire 208 transmits a response signal in response to second signal R2 transmitted by wireless controller 300 (Step S206).

Upon receiving the response signals from luminaire 207 and luminaire 208, controller 320 of wireless controller 300 determines whether or not luminaire 207 and luminaire 208 are the first luminaires. In FIG. 4, luminaire 207 is classified into the first luminaire and stored on storage 330, and thus controller 320 of wireless controller 300 classifies only luminaire 208, which is not classified into the first luminaire, into the second luminaire and stores luminaire 208 on storage 330 (Step S207).

In this manner, controller 320 of wireless controller 300 classifies and stores luminaires 200 on storage 330 based on the transmission level of the wireless signal capable of establishing communication.

It should be noted that at Step S201, for example, controller 320 of wireless controller 300 may transmit first signal R1 multiple times, identify, as the first luminaire, a luminaire that responds to first signal R1 at least the first target number of times among luminaires 207, 208, classify the first luminaire into the first group, and store the first luminaire on storage 330.

For example, controller 320 of wireless controller 300 repeats the transmission of first signal R1 100 times. In the case where the first target number of times is set to 99, upon receiving the response signal 99 or 100 times from luminaire 207 as a response to first signal R1, controller 320 of wireless controller 300 may classify luminaire 207 into the first luminaire.

Moreover, at Step S204, controller 320 of wireless controller 300 may transmit second signal R2 multiple times, identify, as the second luminaire, luminaire 208 that responds to second signal R2 at least the second target number of times, classify luminaire 208 into the second group, and store luminaire 208 on storage 330.

For example, controller 320 of wireless controller 300 repeats the transmission of second signal R2 100 times. In the case where the second target number of times is set to 99, upon receiving the response signal 99 or 100 times from luminaire 208 as a response to second signal R2, controller 320 of wireless controller 300 may classify luminaire 208 into the second luminaire.

FIG. 5 is a diagram illustrating an exemplary relationship between luminaires 200 and levels of transmission power, which is created by controller 320 of wireless controller 300 in lighting system 100 according to this embodiment. In particular, FIG. 5 is a diagram indicating the table information between luminaires 201 to 218 shown in FIG. 1 and transmission levels capable of establishing communication with wireless controller 300. It should be noted that in FIG. 5, the first transmission level of first signal R1 shown in FIG. 1 is set to 1 mW, the second transmission level of second signal R2 shown in FIG. 1 is set to 2 mW, and the third transmission level of third signal R3 shown in FIG. 1 is set to 5 mW.

Controller 320 of wireless controller 300 creates the table shown in FIG. 5 as the table information in accordance with the flows shown in FIG. 3 and FIG. 4. Controller 320 of wireless controller 300 performs paring with luminaires 200, for example, based on the table information. Moreover, controller 320 of wireless controller 300 transmits the wireless signal for controlling the lighting of luminaires 200, for example, based on the table information.

[Advantageous Effects, Etc.]

Lighting system 100 according to this embodiment includes wireless controller 300, two or more luminaires 200 each configured to communicate with wireless controller 300, and storage 330 and/or storage 430. Wireless controller 300 classifies the first luminaire among luminaires 200, which is able to communicate using the first transmission power, into the first group and stores the first luminaire on storage 330 and/or storage 430, and classifies the second luminaire among luminaires 200, which is able to communicate using the second transmission power greater than the first transmission power, into the second group and stores the second luminaire on storage 330 and/or storage 430.

With this configuration, wireless controller 300 can minimize transmission power for transmitting a wireless signal, and transmit the wireless signal. Accordingly, in lighting system 100, it is possible to reduce the transmission power of wireless controller 300 for use in transmission of the wireless signal for controlling luminaire 200.

For example, wireless controller 300 may transmit first signal R1, which is transmitted using the first transmission power, to luminaires 200, identify, as the first luminaire, a luminaire that responds to first signal R1, classify the first luminaire into the first group, and store the first luminaire on storage 330 and/or storage 430. Moreover, after transmitting first signal R1, wireless controller 300 may transmit second signal R2, which is transmitted using the second transmission power, to luminaires 200, identify, as the second luminaire, a luminaire that responds to second signal R2 among luminaires 200 other than the first luminaire, classify the second luminaire into the second group, and store the second luminaire on storage 330 and/or storage 430.

With this configuration, wireless controller 300 can easily classify two or more luminaires 200 according to the transmission power for transmitting the wireless signal.

Moreover, wireless controller 300 may transmit first signal R1 multiple times, identify, as the first luminaire, a luminaire that responds to first signal R1 at least the first target number of times among luminaires 200, classify the first luminaire into the first group, and stores the first luminaire on storage 330 and/or storage 430. Moreover, wireless controller 300 may further transmit second signal R2 multiple times, identify, as the second luminaire, a luminaire that responds to second signal R2 at least the second target number of times, classify the second luminaire into the second group, and store the second luminaire on storage 330 and/or storage 430.

With this configuration, wireless controller 300 can ensure the classification of two or more luminaires 200 according to the transmission power capable of communicating. Accordingly, with this configuration, it is possible to reduce communication errors between wireless controller 300 and luminaire 200.

For example, the second transmission power may be a value obtained by multiplying the first transmission power by a coefficient that is greater than 1.

With this configuration, wireless controller 300 can change the transmission power for the wireless signal in a simple manner and create the table information.

Moreover, wireless controller 300 may include storage 330. In other words, the table information may be stored on storage 330 of wireless controller 300.

With this configuration, wireless controller 300 need not refer to the table information stored on another device such as terminal device 400, and thus it is possible to reduce the loss of time referring to the table information.

Moreover, lighting system 100 may further include terminal device 400 that includes storage 430 and is configured to communicate wireless controller 300. In other words, the table information may be stored on storage 430 of terminal device 400.

With this configuration, for example, when lighting system 100 includes two or more wireless controllers 300, terminal device 400 can collectively manage the table information created by each of wireless controllers 300. This allows terminal device 400 to cause more suitable wireless controller 300 to control luminaire 200, for example.

Moreover, wireless controller 300 may perform pairing with the first luminaire using the first transmission power, and perform pairing with the second luminaire using the second transmission power.

With this configuration, when performing paring with luminaire 200, wireless controller 300 can minimize transmission power for transmitting a wireless signal, and transmit the wireless signal. Accordingly, in lighting system 100, it is possible to reduce the transmission power of wireless controller 300 for use in transmission of the wireless signal for controlling luminaire 200.

Moreover, wireless controller 300 may be configured to transmit a wireless signal for controlling the lighting of paired luminaires 200. In this case, the wireless signal may be transmitted to the first luminaire using the first transmission power, and to the second luminaire using the second transmission power.

With this configuration, when controlling luminaire 200, wireless controller 300 can minimize transmission power for transmitting a wireless signal, and transmit the wireless signal. Accordingly, in lighting system 100, it is possible to reduce the transmission power of wireless controller 300 for use in transmission of the wireless signal for controlling luminaire 200.

Moreover, wireless controller 300 according to this embodiment is wireless controller 300 configured to wirelessly communicate with luminaires 200, which includes: communication unit 310 that communicates with luminaires 200; and controller 320 that classifies the first luminaire among luminaires 200, which is able to communicate via communication unit 310 using the first transmission power, into the first group and stores the first luminaire on storage 330 and/or storage 430; and classifies the second luminaire among luminaires 200, which is able to communicate via communication unit 310 using the second transmission power greater than the first transmission power, into the second group and stores the second luminaire on storage 330 and/or storage 430.

With this configuration, wireless controller 300 can minimize transmission power for transmitting a wireless signal, and transmit the wireless signal. Accordingly, in wireless controller 300, it is possible to reduce the transmission power for the wireless signal for controlling paired luminaire 200.

Moreover, the control method according to this embodiment is a control method for controlling wireless controller 300 configured to wirelessly communicate with luminaires 200, which includes: classifying the first luminaire among luminaires 200, which is able to communicate using the first transmission power, into the first group and storing the first luminaire on storage 330 and/or storage 430; and classifying the second luminaire among luminaires 200, which is able to communicate using the second transmission power, into the second group and storing the second luminaire on storage 330 and/or storage 430.

With this control method, a device that executes the control method can minimize transmission power for transmitting a wireless signal, and transmit the wireless signal. Accordingly, in the control method according to the embodiment, it is possible to reduce the transmission power for the wireless signal for controlling luminaire 200.

Moreover, the present disclosure may be implemented as a non-transitory computer-readable recording medium for use in a computer, the recording medium having a computer program recorded thereon for causing the computer to execute steps included in the control method according to the embodiment.

With this, it is possible to cause a computer to execute the control method according to the embodiment as a program capable of reducing the transmission power for the wireless signal for controlling the luminaire in a simple manner.

Other Embodiments

Hereinbefore, the lighting system, etc. according to the embodiment was described, but the present disclosure is not limited to the above embodiment.

In the above embodiment, the controller is implemented as software by causing a processor to execute a program, but not limited to this. The controller may be implemented as hardware by a dedicated electronic circuit using a gate array or others. Moreover, the present disclosure may be implemented as: a program including processing of each element in the lighting system as steps; and a computer-readable recording medium having the program recorded thereon, such as a flexible disc, a hard disk, a CD-ROM, an MO, a DVD, a DVD-ROM, a DVD-RAM, a BD (Blu-ray (registered trademark) Disc), or a semiconductor memory. Moreover, the program may be distributed via a communication path such as an Internet.

In other words, the foregoing generic or specific aspect may be implemented as a system, a device, an integrated circuit, a computer program, a computer-readable recording medium, or any combination thereof.

Forms obtained by various modifications to the foregoing embodiment that can be conceived by a person of skill in the art as well as forms realized by arbitrarily combining structural components and functions in the embodiment which is within the scope of the essence of the present invention are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system, comprising:
   a wireless controller including a processor, a memory storing a program and a communication unit;
   a plurality of luminaires each configured to communicate with the wireless controller and being assigned with an identifier; and,
   wherein:
   the program, when executed by the processor, causes the wireless controller to classify the plurality of luminaires into groups based on transmission power required to communicate with the wireless controller, by:
      causing the communication unit to transmit a first signal to the plurality of luminaires, the first signal being transmitted using first transmission power,
      identifying, as a first luminaire, a luminaire that responds to the first signal among the plurality of luminaires,
      classifying the first luminaire into a first group, and
      storing an identifier of the first luminaire on the one of the one or more storages, and
   after transmitting the first signal using the first transmission power:
      causing the communication unit to transmit a second signal to the plurality of luminaires, the second signal being transmitted using second transmission power greater than the first transmission power,
      identifying, as a second luminaire, a luminaire that responds to the second signal among the plurality of luminaires other than the first luminaire,
      classifying the second luminaire into a second group, and
      storing an identifier of the second luminaire on the one of the one or more storages.

2. The lighting system according to claim 1, wherein the program causes the wireless controller to cause the communication unit to transmit the first signal multiple times, identify, as the first luminaire, a luminaire that responds to the first signal at least a first target number of times among the plurality of luminaires, classify the first luminaire into the first group, and store the identifier of the first luminaire on the one of the one or more storages, and the program further causes the wireless controller to cause the communication unit to transmit the second signal multiple times, identify, as the second luminaire, a luminaire that responds to the second signal at least a second target number of times among the plurality of luminaires, classify the second luminaire into the second group, and store the identifier of the second luminaire on the one of the one or more storages.

3. The lighting system according to claim 1, wherein the second transmission power is a value obtained by multiplying the first transmission power by a coefficient that is greater than 1.

4. The lighting system according to claim 1, wherein the wireless controller includes the one of the one or more storages.

5. The lighting system according to claim 1, further comprising:
a terminal device that includes the one of the one or more storages and is configured to communicate with the wireless controller.

6. The lighting system according to claim 1, wherein:
the program causes the wireless controller to perform pairing with the first luminaire using the first transmission power, and
the program causes the wireless controller to perform pairing with the second luminaire using the second transmission power.

7. The lighting system according to claim 6, wherein:
the program causes the wireless controller to transmit a wireless signal for controlling lighting of the plurality of luminaires paired, and
the wireless signal is transmitted
to the first luminaire using the first transmission power, and
to the second luminaire using the second transmission power.

8. A wireless controller configured to wirelessly communicate with a plurality of luminaires each assigned with an identifier the wireless controller comprising:
a communication unit that communicates with the plurality of luminaires;
a storage; and
a controller configured to classify the plurality of luminaires into groups based on transmission power required to communicate with the wireless controller, wherein:
the controller includes a processor and a memory storing a program, and
the program, when executed by the processor, causes the controller to:
cause the communication unit to transmit a first signal to the plurality of luminaires, the first signal being transmitted using first transmission power,
identify, as a first luminaire, a luminaire that responds to the first signal among the plurality of luminaires,
classify the first luminaire into a first group, and
store an identifier of the first luminaire on the storage, and after transmitting the first signal using the first transmission power:
cause the communication unit to transmit a second signal to the plurality of luminaires, the second signal being transmitted using second transmission power greater than the first transmission power,
identify, as a second luminaire, a luminaire that responds to the second signal among the plurality of luminaires other than the first luminaire,
classify the second luminaire into a second group, and
store an identifier of the second luminaire on the storage.

9. A control method for controlling a wireless controller configured to wirelessly communicate with a plurality of luminaires each assigned with an identifier by classifying the plurality of luminaires into groups based on transmission power required to communicate with the wireless controller, the control method comprising:
transmitting, by using wireless communication, a first signal to the plurality of luminaires, the first signal being transmitted using the first transmission power;
identifying, by the wireless controller, as a first luminaire, a luminaire that responds to the first signal among the plurality of luminaires;
classifying, by the wireless controller, the first luminaire into a first group;
storing, by the wireless controller, an identifier of the first luminaire on a storage, and
after transmitting the first signal using first transmission power, transmitting, by using wireless communication, a second signal to the plurality of luminaires, the second signal being transmitted using second transmission power greater than the first transmission power;
identifying, by the wireless controller, as a second luminaire, a luminaire that responds to the second signal among the plurality of luminaires other than the first luminaire;
classifying, by the wireless controller, the second luminaire into a second group; and
storing, by the wireless controller, an identifier of the second luminaire on the storage.

10. A non-transitory computer-readable recording medium for use in a computer and having a computer program recorded thereon for causing the computer to execute the control method according to claim 9.

* * * * *